(12) United States Patent
Kalanithi et al.

(10) Patent No.: US 8,401,475 B2
(45) Date of Patent: Mar. 19, 2013

(54) DATA COMMUNICATION AND OBJECT LOCALIZATION USING INDUCTIVE COUPLING

(75) Inventors: Jeevan Kalanithi, San Francisco, CA (US); David Merrill, San Francisco, CA (US)

(73) Assignee: Sifteo, Inc., San Francisco, CA (US)

( * ) Notice: Subject to any disclaimer, the term of this patent is extended or adjusted under 35 U.S.C. 154(b) by 113 days.

(21) Appl. No.: 12/909,690

(22) Filed: Oct. 21, 2010

(65) Prior Publication Data

US 2011/0097996 A1  Apr. 28, 2011

Related U.S. Application Data

(60) Provisional application No. 61/254,324, filed on Oct. 23, 2009.

(51) Int. Cl.
*H04B 7/00* (2006.01)
(52) U.S. Cl. .................. 455/41.2; 455/41.1; 455/41.3
(58) Field of Classification Search ........ 455/41.1–41.3, 455/550.1, 556.1
See application file for complete search history.

(56) References Cited

U.S. PATENT DOCUMENTS

| | | | |
|---|---|---|---|
| 7,636,794 B2 | 12/2009 | Ramos et al. | |
| 7,710,349 B2 | 5/2010 | De Leon | |
| 2002/0132585 A1 | 9/2002 | Palermo et al. | |
| 2004/0075823 A1 | 4/2004 | Lewis et al. | |
| 2005/0104577 A1 | 5/2005 | Matei et al. | |
| 2007/0052596 A1 | 3/2007 | Liu et al. | |
| 2008/0267436 A1* | 10/2008 | Kerselaers et al. | 381/315 |
| 2008/0299904 A1 | 12/2008 | Yi et al. | |
| 2009/0029646 A1 | 1/2009 | Kristiansen et al. | |

* cited by examiner

*Primary Examiner* — Tuan H Nguyen
(74) *Attorney, Agent, or Firm* — Martensen IP; Michael C Martensen

(57) ABSTRACT

An apparatus and method are disclosed for a software and hardware configuration that uses inductive coupling to allow a physical object to determine information describing another physical object. An inductor capacitor circuit acts as a transmitter as well as a receiver of inductive field. A voltage signal provided to an inductor in an object causes the inductor to generate inductive field received by another inductor in a second object. An object receiving inductive field from another object analyzes the inductive field to receive arbitrary data, including but not limited to data that can allow the receiving object to determine the identity of the object transmitting the inductive field. The object receiving the inductive field can also determine the distance between the receiving object and the transmitting object based on the strength of a signal generated by the inductive field.

33 Claims, 12 Drawing Sheets

ACTIVE (SUCCESSFUL COMMUNICATION BETWEEN ELEMENTS)

INACTIVE (NO COMMUNICATION BETWEEN ELEMENTS)

ACTIVE (SUCCESSFUL COMMUNICATION BETWEEN ELEMENTS)

DATA COMMUNICATION AND OBJECT LOCALIZATION USING INDUCTIVE COUPLING

CROSS REFERENCES TO RELATED APPLICATIONS

This application claims the benefit of U.S. Provisional Application No. 61/254,324, filed Oct. 23, 2009, which is incorporated by reference in its entirety.

BACKGROUND

1. Field of Art

The disclosure generally relates to the field of electronics, particularly in the field of computing interaction.

2. Description of Art

A variety of wireless communication systems have been devised to solve a host of needs. However, no such schemes combine resistance to optical noise and the ability to localize different faces of physical objects down to centimeter resolution. Most systems are based on infrared light modulation or other higher frequency radio communication. Infrared is in particular vulnerable to interference from other light sources, particularly the sun. Higher frequency radio systems require sensitive antenna design and entail a great deal of labor to properly design and implement. These solutions are thus relatively high cost. These systems typically radiate signals fairly evenly in three-dimensional space, making it difficult to determine which face of a transmitting object is near another sensing object. Further, sonic or ultrasonic solutions are particularly vulnerable to multi-path distortions and are expensive solutions, requiring more hardware (speaker, microphone) and generally more complex encoding and decoding algorithms.

SUMMARY

Apparatus and methods allow wireless communication between two objects based on inductive coupling. A first inductor coupled to a first object generates an inductive field in response to a transmit signal provided to the inductor. A second inductor coupled to a second object generates a signal responsive to the inductive field generated by the first inductor. An analog to digital convertor is coupled to the second inductor to receive the signal generated by the first inductor and convert it to a digital signal output. The output of the analog to digital convertor is processed by a processor coupled to the analog to digital convertor. The processor converts the digital signal output to a value indicative of a distance between the first physical object and the second physical object based on the strength of the received signal. The transmit signal can also can also encode arbitrary data, which the processor can interpret and act upon.

Another embodiment allows wireless communication between two objects based on inductive coupling. A first inductor coupled to a first object generates an inductive field in response to a transmit signal provided to the inductor. The transmit signal can encode an arbitrary signal, for example, a data value or any information. A second inductor coupled to a second object generates a signal responsive to the inductive field generated by the first inductor. A comparator compares the signal generated by the second inductor with a threshold voltage signal. In an embodiment the comparator can be implemented using an op-amp (operational amplifier). A first input of the comparator is coupled to the second inductor and a second input of the comparator is coupled to the threshold voltage signal. The comparator output comprises a pulse or a sequence of pulses. A processor is coupled to the output of the comparator, and is configured to convert the comparator output to a value indicative of a distance between the first physical object and the second physical object based on the number of pulses in the sequence of pulses. The sequence of pulses can also encode arbitrary data. For example, the data may identify the ID of the first object. The processor can decode and act upon this data.

Another embodiment allows wireless communication between two objects based on inductive coupling. A first inductor coupled to a first object generates an inductive field in response to a transmit signal provided to the inductor. A second inductor coupled to a second object generates a signal responsive to the inductive field generated by the first inductor. A processor is coupled to the second inductor. The processor is configured to convert the signal generated by the second inductor to a value indicative of a distance between the first physical object and the second physical object. The transmit signal can also encode arbitrary data, which the processor can interpret and act upon.

Another embodiment allows wireless communication between two objects based on inductive coupling. A first inductor coupled to a first object generates an inductive field in response to a transmit signal provided to the inductor. A second inductor coupled to a second object generates a signal responsive to the inductive field generated by the first inductor. A gain stage is coupled to the second inductor. The gain stage is coupled to a processor, directly or via a transistor, field-effect-transistor (FET), or comparator. The processor is configured to convert the signal generated by the gain stage to a value indicative of a distance between the first physical object and the second physical object. The transmit signal can also encode arbitrary data, which the processor can interpret and act upon via the gain stage.

A circuit allows transmitting and receiving signal across two physical objects via inductive coupling. The circuit comprises a first inductor coupled in parallel to a capacitor to form an inductor-capacitor pair. A first end of the inductor-capacitor pair is connected to a ground connection. A transmit signal is connected to a second end of the inductor-capacitor pair. The transmit signal is a varying voltage signal causing the inductor to generate an inductive field. The first end of the inductor-capacitor pair is coupled to a circuit component to provide input to the circuit component. The input to the circuit component comprises a signal generated by the inductor responsive to an inductive field impinging on the inductor.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
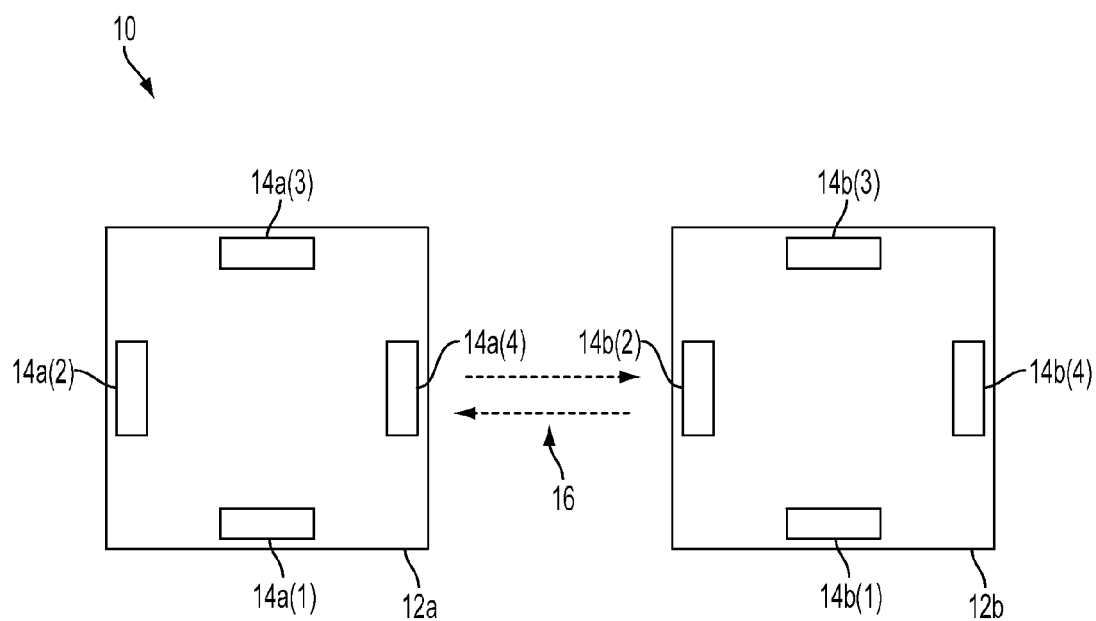
FIG. 1 illustrates one embodiment of a perspective view of a top-down diagram of physical devices configurable for communication between each other.

One embodiment of a disclosed system, method and computer readable storage medium that includes a software and hardware configuration that includes near-field data communication and object localization. Referring to Figure (FIG. 1 there is shown a system 10 of physical objects. The physical objects include a first physical object 12a and a second physical object 12b (generally 12). Each physical object 12a, 12b includes at least one communication element 14. Here, the illustrated configuration includes four (4) communication element 14a(1)-(4), 14b(1)-(4) (generally 14) per physical object 12a, 12b. Each communication element 14 of a physical object, e.g., 12a is capable of wirelessly communicating with another communication element 14 of the other physical object, e.g., 12b. In the illustrative example, the communication comprises one or more messages 16. It is noted that although FIG. 1 depicts four communication elements 14 per physical object 12a, 12b, this is for illustration purposes only and that each object 12a, 12b could have any number of communication elements 14.

Each communication element 14a of the first physical object 12a is capable of wireless communication with any other communication element 14b of the second physical object 12b, provided they are sufficiently close to one another. The communication is established using inductive coupling as further described below. The message 16 from one communication element, e.g., 14a, to another communication element, e.g., 14b, can contain arbitrary data, which a computing unit in object 16 can either interpret in the context of a software application, or transmit via any means to another destination for further processing.

It is noted that there are no specific limits on the size of the objects 12 depicted, nor on the size of the communication elements 14 depicted, nor on the distance that a message 16 can be successfully transmitted. The distance just mentioned must be near enough to support inductive coupling as described below. This distance varies with the physical properties of the communication elements 14 as described below.

In one embodiment the physical objects 12 can be made of any material that does not overly interfere with inductive coupling as described below. Examples of acceptable materials include, but are not limited, to plastic, fiberglass, glass, and wood. The communication elements 14 include a coil of conducting material, such as (but not limited to), copper, iron, and gold. The coil is also known as an inductor, and is further illustrated and described with respect to FIG. 2. The communication elements also include other components, as further described below.

Example Communication Configuration

Figure 2:
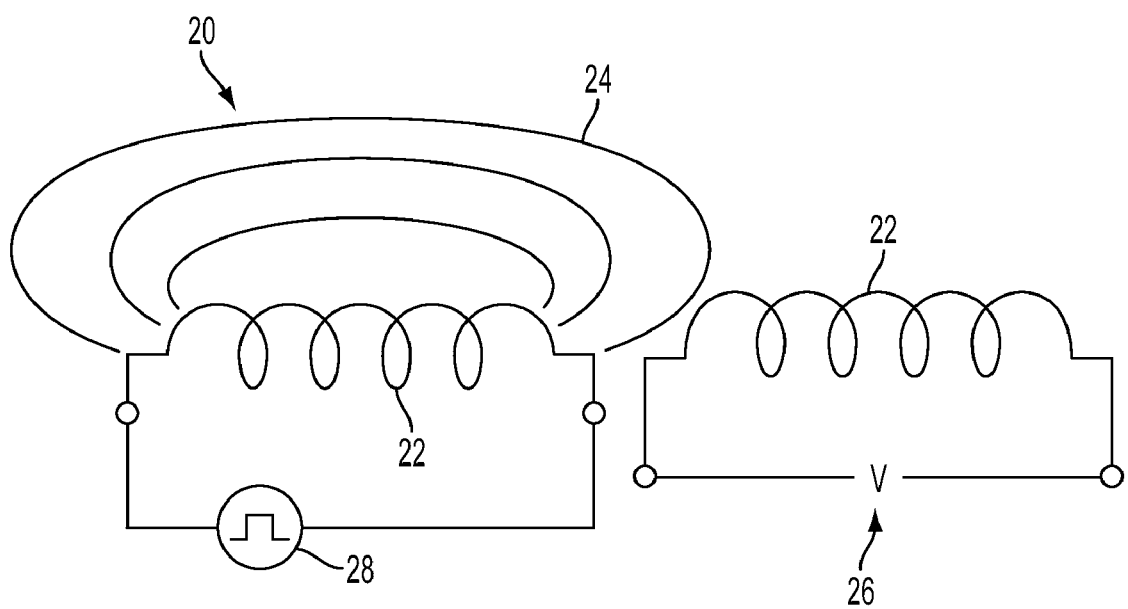
FIG. 2 illustrates one embodiment of a communication elements configuration for a transmitting sensor and receiving sensor.

FIG. 2 illustrates one embodiment of a communication element 14 configuration for a transmitting sensor and receiving sensor. The configuration as illustrated may be referenced as a system 20. The system 20 is configured to include inductive coupling. In the system 20, a voltage signal 28 can be placed across an inductor 22 that can induce a voltage 26 in another nearby inductor 22, because the signal voltage 28 placed across the transmitting inductor creates a field 24 that can couple into the receiving inductor. By placing and removing an oscillating signal voltage 28 across a transmitting inductor in a pattern, messages of arbitrary data are created that can be received and interpreted by the receiving inductor. The presence or absence of a signal can be interpreted according to the specific application.

Figure 3:
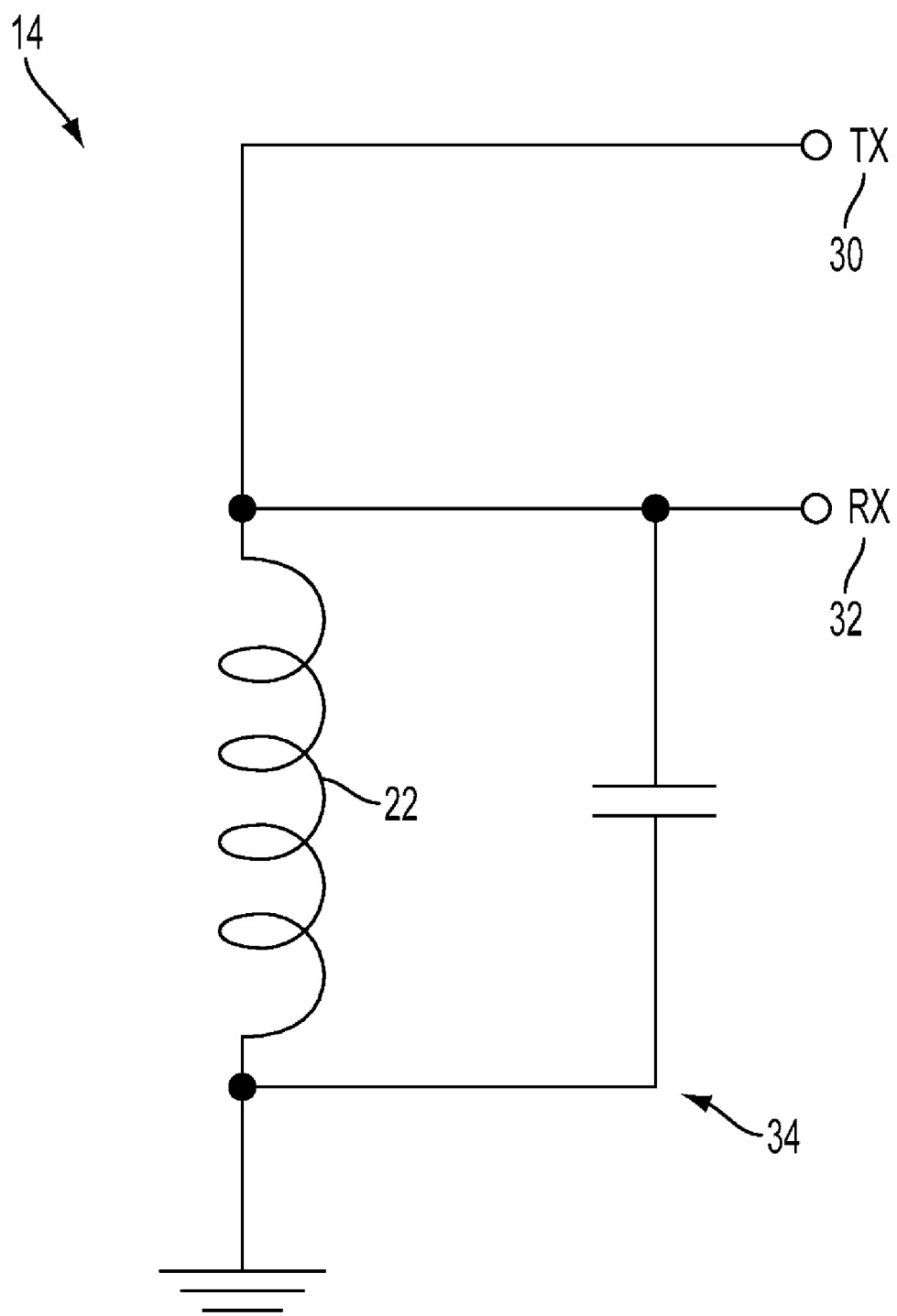
FIG. 3 illustrates one embodiment of a communication element of a physical object.

Turning to FIG. 3, it illustrates one embodiment of a communication element 14 of a physical object. In particular, the figure illustrates one embodiment of a circuit diagram depicting the subcomponents of the communication element 14. The circuit includes an inductor 22, an inductor-capacitor (LC) circuit 34, a transmit input 30 and a receive input 32.

Operationally, a varying voltage signal can be placed across the transmit input 30. The LC circuit 34 resonates and creates a field if the transmit input contains energy at its resonant frequency, according to a formula:

$$f = \frac{1}{2\pi\sqrt{LC}}$$

It is noted that values of the inductor 22 and capacitor in the LC circuit 34 can be selected to resonate at a chosen frequency. Further, a field created at the same or similar frequency impinging upon the circuit 34 will induce a voltage on the LC circuit 34, causing it to produce a voltage, which can be sensed and interpreted on receive input 32. In this way, the communication element 14 can be used to both transmit and receive messages wirelessly, e.g., the message 16.

Figure 4:
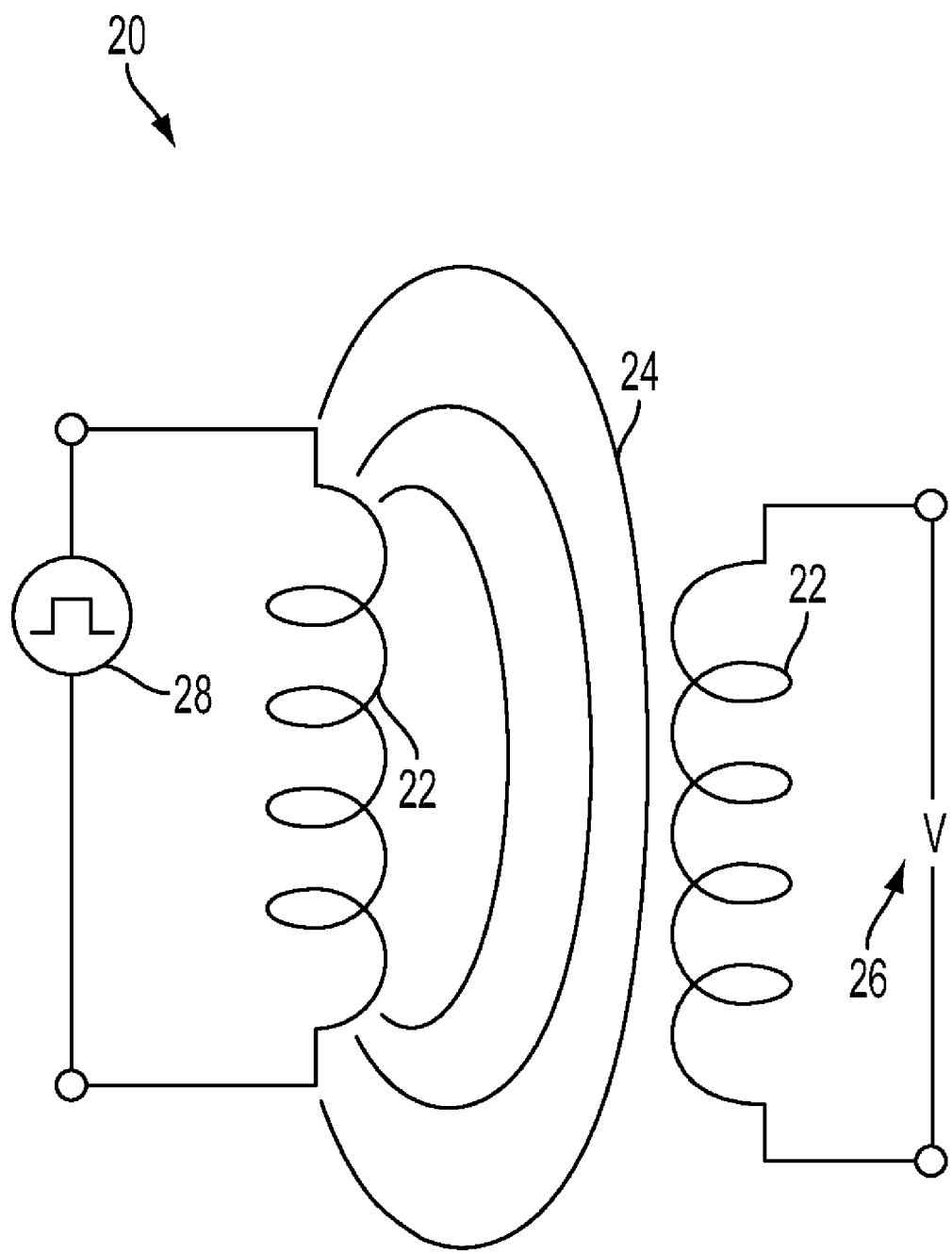
FIG. 4 illustrates one embodiment of an alternate layout a communication elements configuration for a transmitting and receiving sensor.

FIG. 4 illustrates one embodiment of an alternate layout for a communication elements configuration for a transmitting and receiving sensor. This configuration is an alternate configuration for the system 20. Here, the inductors 22 can be placed face-to-face, as shown in FIG. 4, or in any of a variety of orientations with respect to one another. Functionally, the system 20 can be configured for operation in orientations shown in FIG. 4, as well as in other spatial orientations using the components described.

Figure 5:
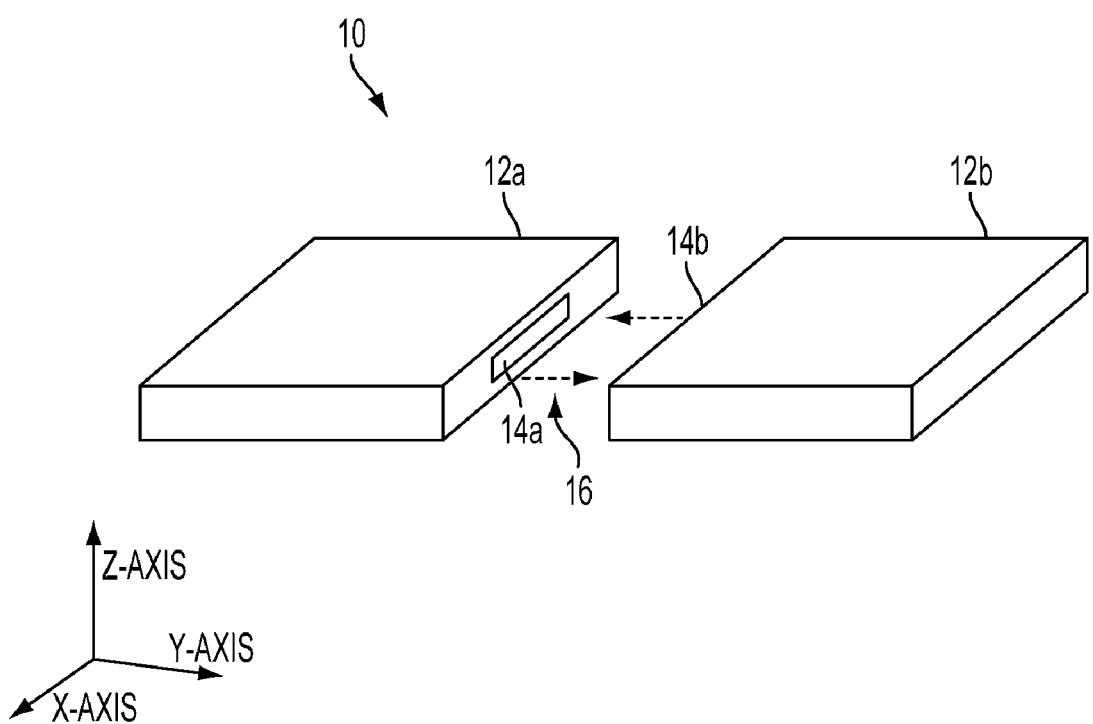
FIG. 5 illustrates one embodiment of a three dimensional representation of communicating devices, e.g., as shown in FIG. 1.

FIG. 5 illustrates one embodiment of a three dimensional representation of communicating devices, e.g., as shown in the system 10 configuration of FIG. 1. As previously noted, the first physical object 12a and the second physical object 12b each include one or more respective communication elements 14a, 14b that transmit messages 16 embodied as communication signals 16. The messages 16 can be successfully transmitted when the communication elements 12a, 12b of each respective physical object 12a, 12b are placed facing one another. For example, messages 16 are passed as a communication signal when a first communication element 14a(1) of the first physical object 12a faces in close proximity a first communication element 14b(1) of the second physical object 12b. It is noted that the messages 16 passed via communication signals between the communication elements 14a(1), 14b(1) can occur either when the physical objects 12a, 12b are in the same plane as well as when they are not co-planar, but are sufficiently close to one another along any axis. FIG. 5 illustrates two physical objects adjacent to each other along the x-y plane of a Cartesian coordinate system. The objects themselves are placed in the x-y plane i.e., horizontally.

Figure 6A:
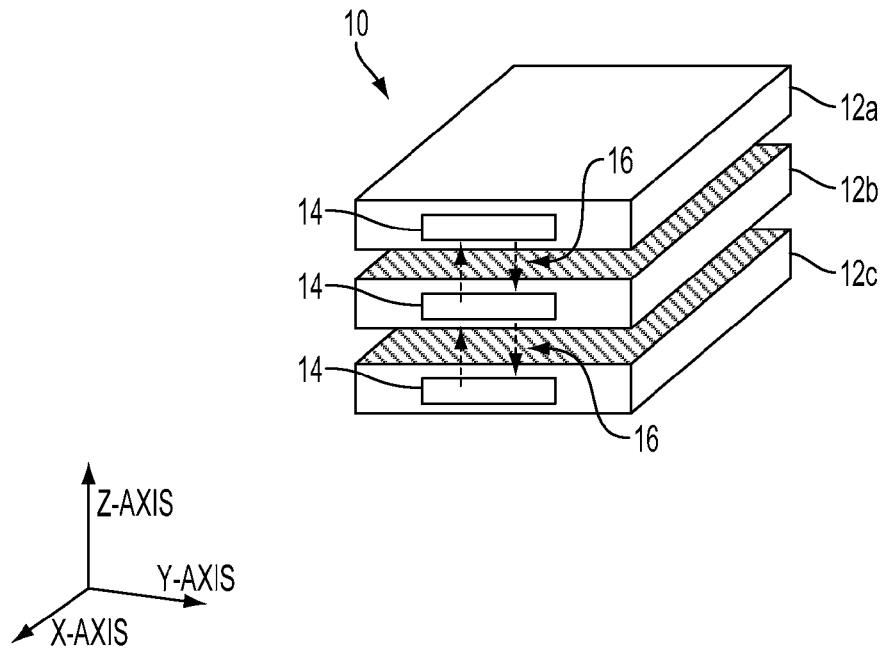
FIGS. 6(a-b) illustrate other embodiments of a three dimensional representation of communication devices, e.g., as shown in FIGS. 1 and 5.
Figure 6B:
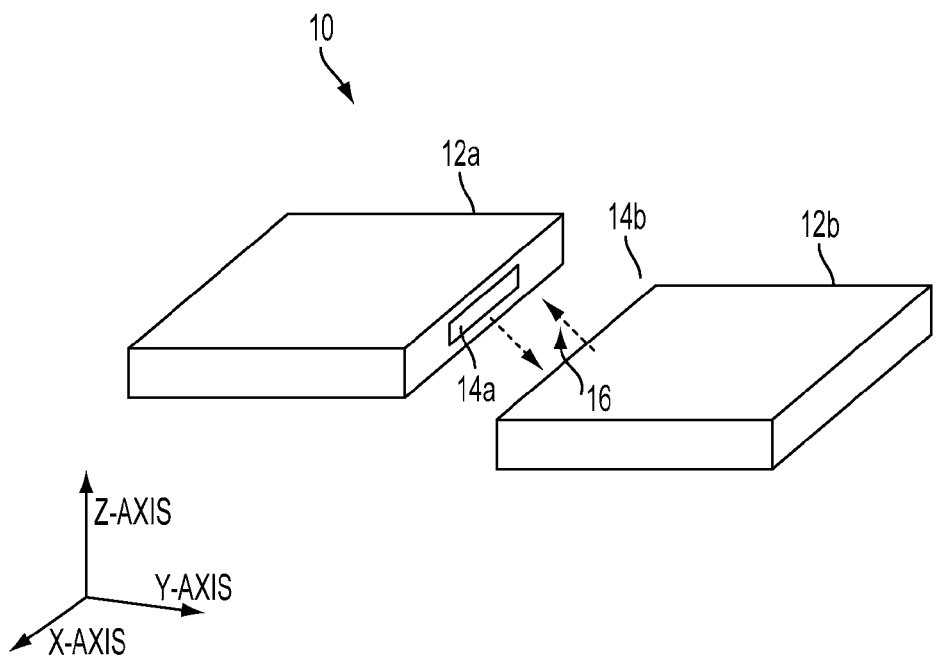

FIG. 6(a) illustrates another embodiment of a three dimensional representation of communication devices, e.g., as shown in FIGS. 1 and 5. In this configuration the physical objects 12a, 12b, 12c include communication elements 14 that communicate signals 16. Note that the communication elements 14, as described above, can successfully transmit signals 16 along any spatial axis. In this case, the objects 12 can be directly on top of one another and signals 16 can be successfully transmitted. Also note that the configurations disclosed apply to systems 10 with any plurality of objects 12 and communication elements 14. As illustrated in FIG. 6(a), each object is placed in an x-y plane of a Cartesian coordinate system (horizontally) but multiple objects aligned along a z-axis. FIG. 5 illustrates placing the objects adjacent to each other in the x-y plane and FIG. 6(a) illustrates placing one object on top of the other. However, the communication between the objects functions correctly for other alignments as well. For example, FIG. 6(b) illustrates communication between the objects when they are in planes parallel to each other but at a position which is not directly vertical with respect to each other but at an angle. Similarly, the communication between the objects functions even if one object is held at an angle with respect to the other object (such that the planes of the two objects are not parallel to each other).

Figure 10:
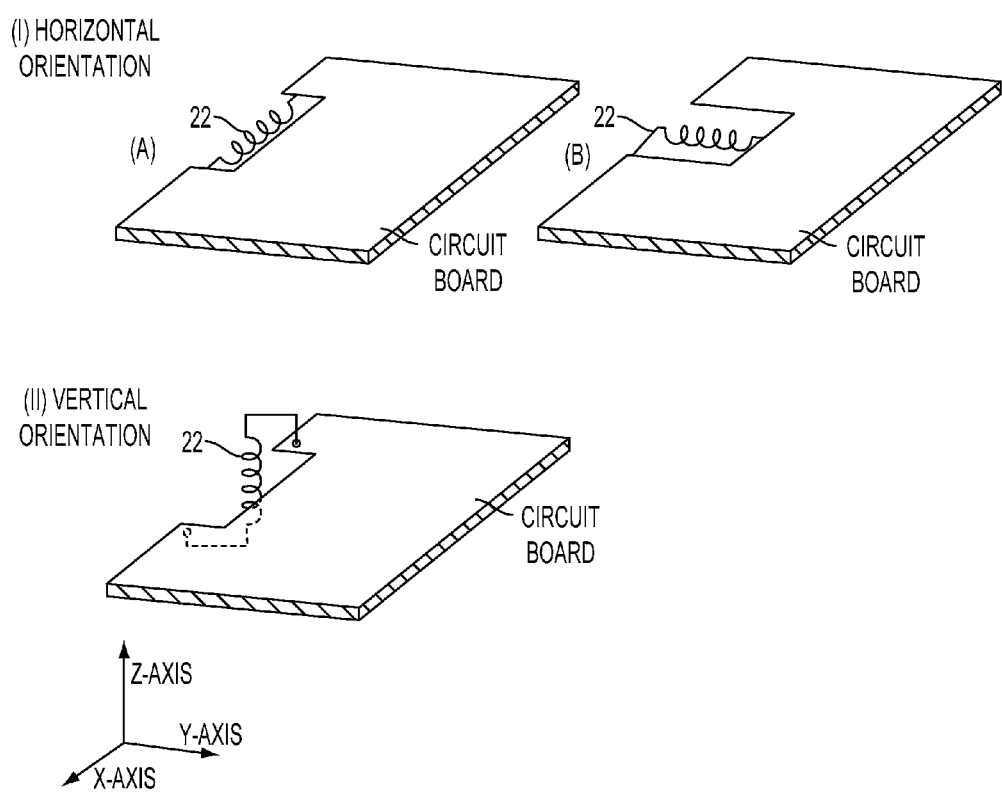
FIG. 10 illustrates the various embodiments with different orientations of the inductor with respect to a circuit board on which the inductor is installed.

FIG. 10 shows three different embodiments illustrating three different ways in which the inductors 22 can be oriented with respect to one another in physical space. In FIG. 10(A) and (B), the inductors are oriented in a plane, same as that of the plane of the circuit board ("horizontal orientation"). In FIG. 10(C), the inductor is oriented perpendicular to the circuit board ("vertical orientation"). Based on the characteristics of the field, the vertical orientation ensures that the communication elements will successfully transmit with one another in a contiguous spatial area in the plane of the circuit board.

Figure 11:
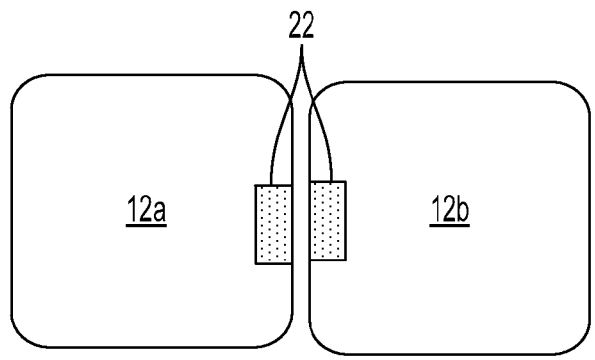
FIG. 11 illustrates non-contiguous active areas in horizontally oriented inductors, in accordance with an embodiment.
Figure 11:
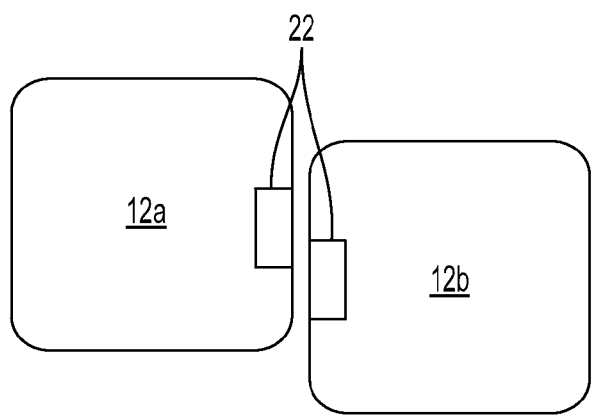
Figure 11:
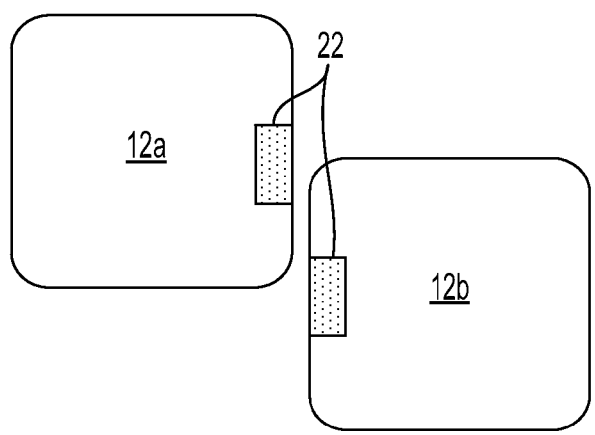
Figure 12:
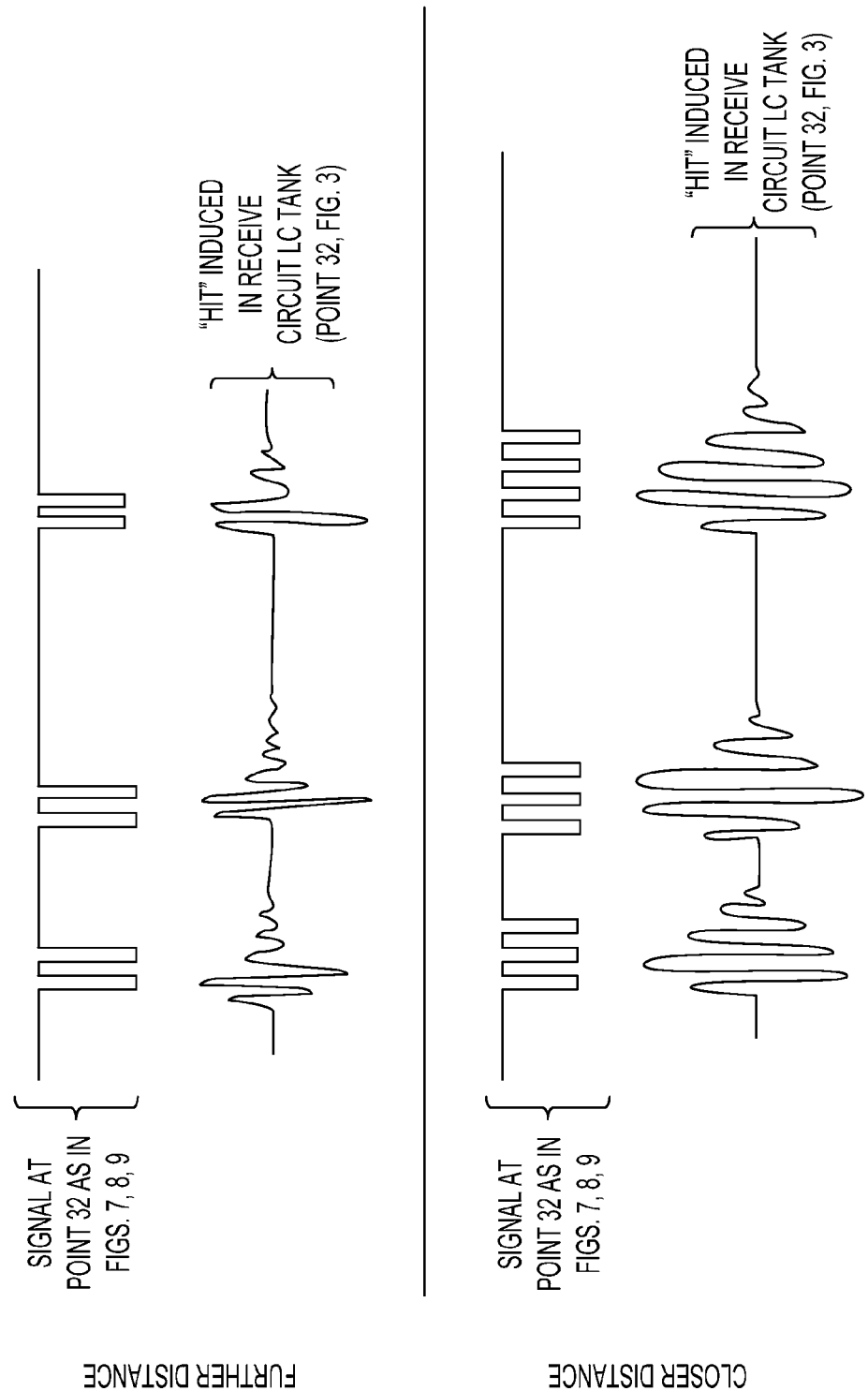
FIG. 12 illustrates the impact of varying the distance between the inductors of two objects on the signal generated by the receiving inductor, in accordance with an embodiment.

FIG. 11 illustrates how horizontally oriented inductors can exhibit non-contiguous areas of successful communication in the plane of the circuit board. In many use cases, especially those involving a human-operated device, successful communication in non-contiguous areas in the plane of the circuit board can be a source of confusion for the user. For example, in a toy allowing user to place objects adjacent to each other, a user may be confused if two objects indicate they are aligned even if they are not. For example, a game involving physical placement of such objects may indicate successful completion based on an incorrect alignment of objects.

The system 10 of communication elements 14 can be used to transmit arbitrary data, for example, as shown in FIGS. 5 and 6. The distance at which such communication occurs can be made small (for example, 1 centimeter (cm)). This allows elimination of interference that could be caused by objects that are at a distance greater than a threshold value. The distance at which communication occurs can be controlled by controlling various parameters related to the inductive field. These include, an amount of current flowing through the transmitting inductor 22, a number and diameter of coils in inductor 22, the internal impedance of inductor 22, a material of the core of inductor 22, whether inductor 22 has external shielding material surrounding it, and the like. A mere presence of a signal element 16 (for example, as shown in FIGS. 5 and 6) can be used to determine location of objects, in terms of which objects are next to one another, and which face of the objects are next to one another. Further, the strength of the signal element 16, in terms of its peak voltage 26, can be measured by receive input 32. The strength of the signal 16 can be translated into a specific distance, since the peak voltage induced by a transmitting communication element 14 into a receiving communication element 14 is directly correlated with distance between the two elements. This voltage can be measured by a processor using an analog-to-digital converter. This measurement allows the system to accurately determine exactly how far one object 12 is from another object 12. In this way, the system 10 can be used to determine object location.

The disclosed configuration allows for a field 24 that radiates in three dimensions. Hence, objects can be detected and their location determined proximate to each other within three-dimensions (e.g., an x-axis, y-axis and z-axis within a Cartesian coordinate system). Radiation of a field 24 as described beneficially provides an additional layer of information for the physical objects with respect to their location relative to each other, for example, in configurations in which the physical objects are placed on top of one another the respective physical object can determine that they are in a stack.

Figure 7:
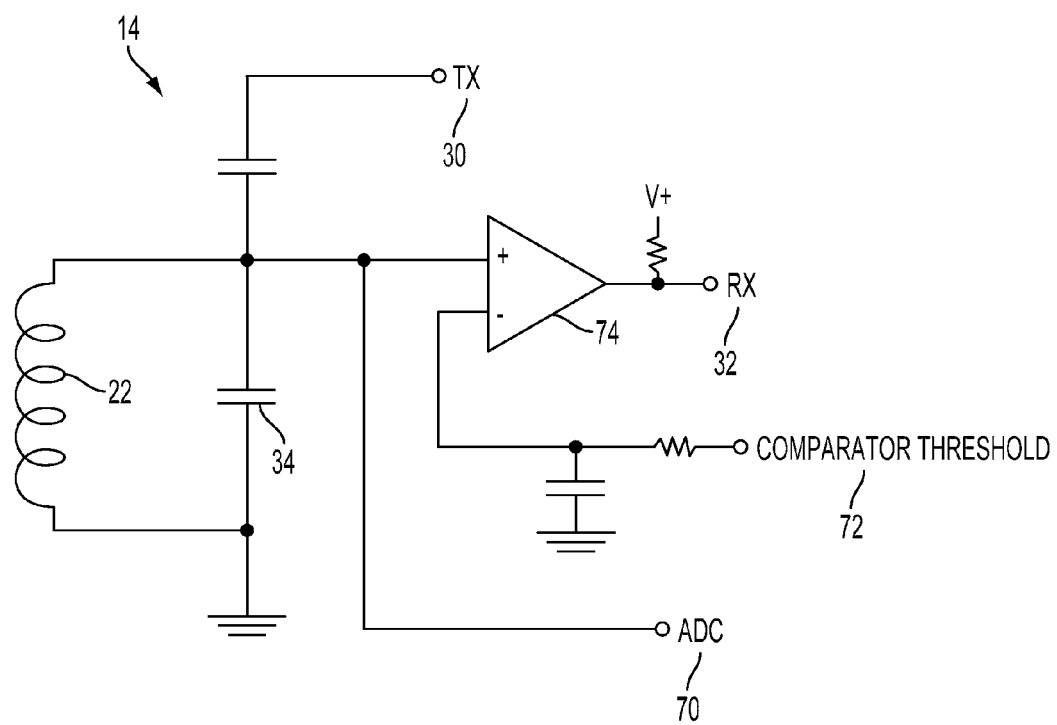
FIG. 7 illustrates one embodiment of a circuit that implements a communication element shown in FIG. 3.

Referring now to the embodiment shown in FIG. 7, a circuit diagram provides an example embodiment of communication element 14. These include the inductor 22, the LC circuit 34, a transmit input 30 and a receive input 32. This diagram shows more detail as to a possible embodiment of signal transmit and receive functionality. In particular, note elements 70 (ADC/ADC1/ADC2), in which communication element 14 can measure, using and Analog-to-Digital Converter ("ADC") 70, or similar system, the size of the voltage signal in order to estimate distance from another transmitting communication element 14. Note in the diagram that this signal level may be measured at various points in the circuit, depending on the desired level of amplification of the received signal at the time of measurement. In this embodiment, a comparator 74 sensitivity can be set with a threshold voltage 72 to tune the sensitivity of the circuit, which can also be used to estimate distance from another transmitting communication element 14.

Figure 8:
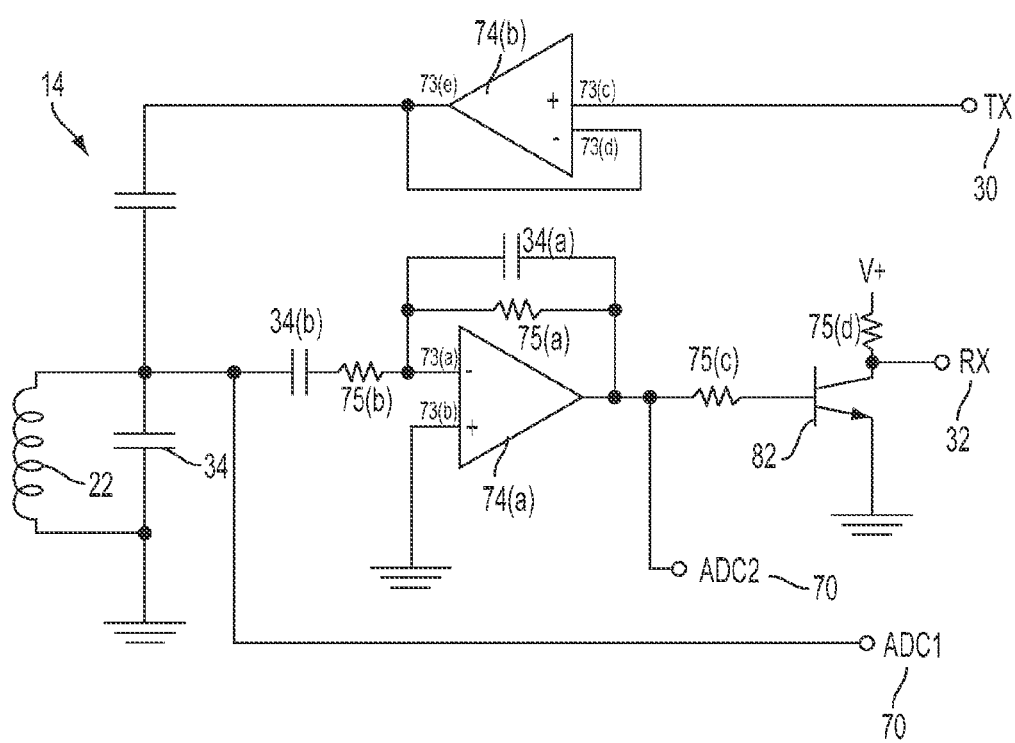
FIG. 8 illustrates another embodiment of a circuit that implements a communication element shown in FIG. 3.

Referring now to the embodiment shown in FIG. 8, a circuit diagram provides an example embodiment of communication element 14. These include an inductor 22, an LC circuit 34, a transmit input 30 and a receive input 32. This diagram shows more detail as to a possible embodiment of signal transmit and receive functionality. In particular, the circuit controls for variations in the input impedance of the transmit signal and controls for general circuit noise. As shown in FIG. 8, the op-amp 74(a) input 73(a) is connected to the signal generated by the inductor 22 via a resistor 75(b) and an optional capacitor 34(b) connected serially. The op-amp 74(a) is further connected to a resistor 75(a) and an optional capacitor 34(a) each connected in parallel with the input of the op-amp and the output of the op-amp 74(a). The output of the op-amp 74(a) can be input to analog-to-digital convertor ADC2 70. The output of the op-amp 74(a) is also connected via resistor 75(c) to a transistor 82 that outputs the signal RX 32. The signal TX 30 is input to an op-amp 74(b) that provides feedback of its output to one of the inputs. The output of the op-amp 74(b) is connected via a capacitor 14 to the inductor-capacitor pair formed by inductor 22 and capacitor 34.

Figure 9:
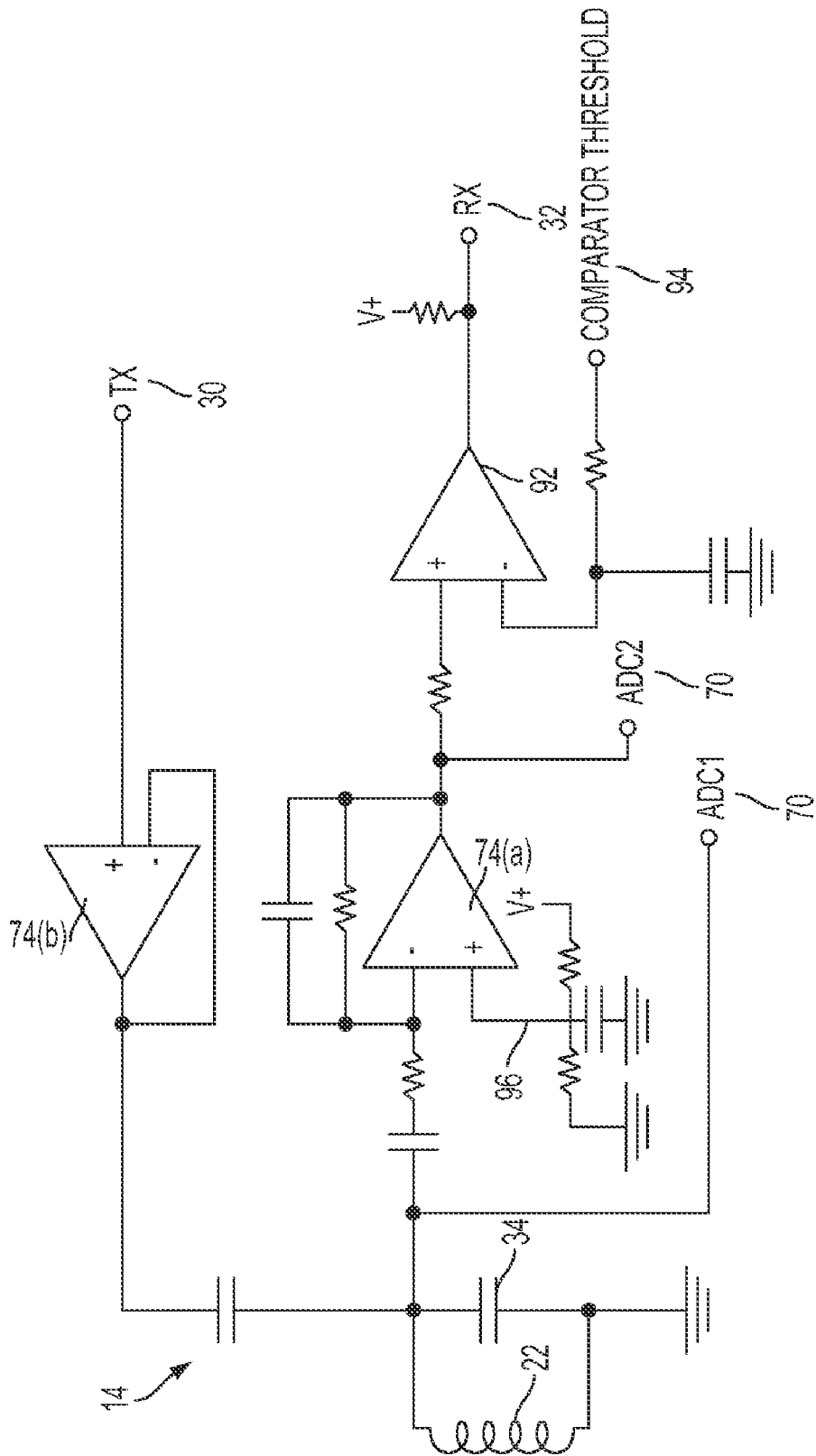
FIG. 9 illustrates a third embodiment of a circuit that implements a communication element shown in FIG. 3.

Referring now to the embodiment shown in FIG. 9, a circuit diagram provides an example embodiment of communication element 14. These include an inductor 22, an LC circuit 34, a transmit input 30 and a receive input 32. This diagram shows more detail as to a possible embodiment of signal transmit and receive functionality (several elements shown in FIG. 9 are as illustrated in FIG. 8). In particular, the circuit controls for variations in the input impedance of the transmit signal and controls for general circuit noise. Voltage bias in element 96 allows detection of the full peak-to-peak voltage swing of the input receive signal, increasing sensitivity of the circuit. Inclusion of the comparator 92 allows for control of receive sensitivity as well using comparator threshold 94, because a comparator can be designed to detect smaller signals than a simple transistor 82, as shown in FIG. 8.

It should be clear that elements in each of the circuits shown in FIGS. 3 and 7 through 10 can be mixed and matched in a specific embodiment, and that these figures do not exhaustively list all circuits that are embodiments. The disclosed configurations also can be used to measure distance from one element 14 to another element 14 in another fashion that does not use an analog-to-digital converter.

Referring now to the invention shown in FIGS. 7,8 and 9, the closer a transmitting element inductor 22 is to a receiving element inductor 22, the greater the number of pulses that will be generated at point 32 in the circuit. A transmitting element inductor 22, when excited by an incoming electrical pulse, induces a damped sinusoidal signal in the receiving element inductor 22. The voltage level of each peak in the induced damped sinusoidal signal increases as the transmitting inductor 22 is brought closer to the receiving inductor 22. Since a pulse is produced at point 32 in the circuit for every peak that passes a certain threshold in the receiving element inductor 22, a nearby transmitting inductor 22 will cause more pulses at 32 than one that is farther away.

Given this behavior in the circuit, the system can count the number of pulses within a certain time frame that are induced at point 32, and infer the distance between the receiving element inductor 22 and the transmitting element inductor 22.

Example Data Communication and Object Localization

Provided below are example protocols for data communication and/or object localization for use with the system 10. In particular, three example schemas are further described below.

Scheme #1: Asynchronous Three Pulse Protocol

In a first embodiment of a scheme, a physical object 12 sends transmit a message (as a communication signal) 16 on each communication element 14, transmissions are not synchronized with respect to any master schedule. Communication elements 14 are in receive (RX) mode if not being used for transmit (TX). A TX consists of two "hits" at point 32 in the circuit, followed by a third hit. Each "hit" corresponds to an electrical pulse or set of pulses created in a receiving element 14 at point 32 by a signal induced in transmitting element 14. The time offset between the second and third hit encodes the identity of the object 12 and the identity of the specific communication element 14. Similar schemes can use a different number of hits per TX. The time difference between two or more of the hits encodes identification information. Similarly, it would be possible to encode the identity of the object 12 with the time difference between a certain pair of hits, and the identity of the specific communication element 14 with the time difference between a different pair of hits.

Described below is how physical object 12 interprets signals 16 from a receiving communication element 14 to determine the transmitting object 12's identity and the identity of the specific transmitting communication element 14. The interpretation involves a simple state machine that changes states based on the arrival time of incoming transmission pulses. Two states are used.

RX State machine:
State "S1": receiver is waiting to receive $1^{st}$ or 2nd signature hit
State "S2": receiver is waiting to receive 3rd hit
State machine transition map:
BEGIN S1:
if receive pulse within specific pre-determined time offset (+/− some margins of error) from previous hit, go to S2
else, go to S1 (all error cases go to S1)
S2:
if we receive a valid hit, send time offset information to application software, go to S2
if we receive an invalid hit, go to S1

A valid hit is a signal received within any of a set of time intervals, plus or minus some margin of error. The set of time intervals can be stored or generated algorithmically. An invalid hit is a signal received before or after the predetermined length of time interval, outside the margin of error. For example, if the signal is received after a very long period of time, the signal is not considered a part of the current state transition sequence. The application software executing on object 12 or another associated computer system is configured to use the time offset measured in S3, to determine a particular object 12's identity and the identity of the specific transmitting communication element 14. This localization information can now be used and/or transmitted by the object 12 for use in an application.

Scheme #2: Asynchronous Byte-Sending Strategy

A second embodiment of a scheme includes a protocol similar to a previously describe protocol of scheme #1, except that the data is encoded differently. It does not involve an already-determined time offset to a particular object 12 and the identity of the specific transmitting communication element 14. Rather, this information, along with any other information, can be encoded in the transmission signal itself. Each ping or bit corresponds to a hit created in a receiving element 14 at point 32 by a pulse or hit initiated in transmitting element 14.

Scheme #2:
HANDSHAKE (optional)
transmitter sends ping (1 bit)
receiver sends acknowledgment (ACK) ping (1 bit)
BYTE STREAM
transmitter sends bytestream (1 start bit (optional)+N data bits)
error correction code (optional)

The bytestream encodes object 12's identity and the identity of the specific transmitting communication element 14. In some cases it may help for the objects 12 to exchange a "handshake". There are many ways to encode such a handshake, but it may consist of a single hit being transmitted from transmitter to receiver, followed by a single hit being transmitted from receiver to transmitter. Error-correction based on checksum or other forms of error-correction may also be used in this scheme to verify that a received message is valid. In such configurations, some form of acknowledgement by the receiver with possible re-transmission in the case of invalid message receipt may be used.

Scheme #3: Synchronous Strategy

A third example scheme requires a master schedule shared by all objects 12. A temporal sync among all objects is created upon initialization, and a time-slice is allocated for each object and each of its specific transmitting communication elements 14. All objects 12 are aware of the master time schedule: if the object 12 receive a hit at a certain time on one of its communication elements 14, it can uniquely identify the transmitting object 12 and specific communication element 14, since the receiving object 12 is aware of when each other object 12 and communication element 14 should be hit-inducing signal.

Scheme #3:
  During its assigned time slot, the object 12 will emit a transmission pulse on each of its communication elements 14, round-robin
  If any object 12 receives a hit during one of these transmissions, it compares the arrival time of that hit against the master schedule
    the master schedule will determine the identity of the object 12 and specific communication element 14
    the transmitting object 12 and communication element 14 is now known to the receiving object 12, and can be used and/or transmitted by the application The above schemes serve as examples for use in object localization, but are not limited to the schemes listed above. Arbitrary data may be transmitted that can code for location or any other information in a variety of ways.

The advantages of the disclosed configurations include, without limitation, its lower complexity and cost (e.g., only simple passive and/or inexpensive components s are required to implement the solution) and its resistance to noise and interference (e.g., the communication element 14 can be tuned to operate at a frequency with very little natural or man-made interference). Further, the disclosed configurations are resistive to interference with regard to physical material being placed between two communication elements 14. Thus, unlike other solutions, the disclosed configuration can work through solid plastic or other materials, removing the need for unsightly and costly 'windows' or infrared-transparent panels. Moreover, without such limiting factors the disclosed configuration allows for the ability to determine distance between objects 12 and adding manipulation within three-dimensions without unsightly, heavy or expensive physical object structures.

In broad embodiment, a system is configured in which physical objects 12 can be inexpensively instrumented for wireless communication, and in which said wireless communication can be used to localize objects with respect to one another.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for data communication and object localization using inductive coupling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An apparatus for wireless communication between two objects based on inductive coupling between the objects, the apparatus comprising:
 a first inductor coupled to a first capacitor in parallel to form a first inductor-capacitor pair wherein the first inductor-capacitor pair is coupled to a first object, and wherein the first inductor generates an inductive field responsive to a transmit signal;
 a second inductor coupled to a second capacitor in parallel to form a second inductor-capacitor pair wherein the second inductor-capacitor pair is coupled to a second object, and wherein the second inductor generates a signal responsive to the inductive field generated by the first inductor;
 an analog to digital convertor coupled to the second inductor-capacitor pair to convert the signal generated by the second inductor to a digital signal output; and
 a processor coupled to the analog to digital convertor, wherein the processor is configured to convert the digital signal output to a value indicative of a distance between the first physical object and the second physical object.

2. The apparatus of claim 1, wherein the transmit signal is a varying voltage signal.

3. The apparatus of claim 1, wherein the first inductor is further coupled to a first capacitor in parallel to form a first inductor-capacitor pair and the second inductor is further coupled to a second capacitor in parallel to form a second inductor-capacitor pair the first inductor-capacitor has a resonant frequency within a first threshold value of a resonant frequency of the second inductor-capacitor pair.

4. The apparatus of claim 3, wherein the transmit signal includes a signal component at a frequency within a second threshold value of a resonant frequency of the first inductor-capacitor pair.

5. The apparatus of claim 1, the first inductor is physically placed at an angle perpendicular to a circuit board within a threshold angle value, the circuit board comprising at least one component electronically connected to the first inductor.

6. The apparatus of claim 1, wherein the first object and the second object comprise material that does not interfere with the inductive field generated by the first inductor and received by the second inductor.

7. The apparatus of claim 1, wherein the first object is placed on top of the second object to cause the inductive coupling between the first inductor and the second inductor.

8. The apparatus of claim 1, wherein the first object is placed horizontally adjacent to the second object to cause the inductive coupling between the first inductor and the second inductor.

9. An apparatus for wireless communication between two objects based on inductive coupling between the objects, the apparatus comprising:
 a first inductor coupled to a first capacitor in parallel to form a first inductor-capacitor pair wherein the first inductor-capacitor pair is coupled to a first object, and wherein the first inductor generates an inductive field responsive to a transmit signal;
 a second inductor coupled to a second capacitor in parallel to form a second inductor-capacitor pair wherein the second inductor-capacitor pair is coupled to a second object, and wherein the second inductor generates a signal responsive to the inductive field generated by the first inductor;
 a comparator for comparing the signal generated by the second inductor with a threshold voltage signal, wherein a first input of the comparator is coupled to the second inductor, a second input of the comparator is coupled to the threshold voltage signal, and the comparator output comprises one or more pulses; and
 a processor coupled to the output of the comparator, wherein the processor is configured to convert the comparator output to a value indicative of a distance between the first physical object and the second physical object based on the number of pulses in the comparator output.

10. The apparatus of claim 9, wherein a first value indicative of distance determined from a first number of pulses is higher than a second value indicative of distance determined from a second number of pulses if the second number of pulses is higher than the first number of pulses.

11. The apparatus of claim 9, wherein the first inductor is further coupled to a first capacitor in parallel to form a first inductor-capacitor pair and the second inductor is further coupled to a second capacitor in parallel to form a second inductor-capacitor pair the first inductor-capacitor has a resonant frequency within a first threshold value of a resonant frequency of the second inductor-capacitor pair.

12. The apparatus of claim 11, wherein the transmit signal includes a signal component at a frequency within a second threshold value of a resonant frequency of the first inductor-capacitor pair.

13. The apparatus of claim 9, the first inductor is physically placed at an angle perpendicular to a circuit board within a threshold angle value, the circuit board comprising at least one component electronically connected to the first inductor.

14. An apparatus for wireless communication between two physical objects based on inductive coupling between the objects, the apparatus comprising:
 a first inductor coupled to a first capacitor in parallel to form a first inductor-capacitor pair wherein the first inductor-capacitor pair is coupled to a first object, and wherein the first inductor generates an inductive field responsive to a transmit signal;
 a second inductor coupled to a second capacitor in parallel to form a second inductor-capacitor pair wherein the second inductor-capacitor pair is coupled to a second object, and wherein the second inductor generates a signal responsive to the inductive field generated by the first inductor; and
 a processor coupled to the second inductor—capacitor pair wherein the processor is configured to convert the signal generated by the second inductor to a value indicative of a distance between the first physical object and the second physical object.

15. The apparatus of claim 14, wherein the processor is coupled to the second inductor via a an analog to digital convertor, the analog to digital convertor converts the signal generated by the second inductor to a digital signal output and the processor configured to determine the value indicative of the distance based on the digital signal.

16. The apparatus of claim 14, wherein the processor is coupled to the second inductor via a comparator coupled with the second inductor for receiving the generated signal, wherein the comparator compares the generated signal with a fixed threshold signal, to output a set of pulses.

17. The apparatus of claim 14, wherein the first inductor is further coupled to a first capacitor in parallel to form a first inductor-capacitor pair and the second inductor is further coupled to a second capacitor in parallel to form a second inductor-capacitor pair the first inductor-capacitor has a resonant frequency within a first threshold value of a resonant frequency of the second inductor-capacitor pair.

18. The apparatus of claim 17, wherein the transmit signal includes a signal component at a frequency within a second threshold value of a resonant frequency of the first inductor-capacitor pair.

19. The apparatus of claim 14, wherein the first inductor is physically placed at an angle perpendicular to a circuit board within a threshold angle value, the circuit board comprising at least one component electronically connected to the first inductor.

20. An apparatus for wireless communication between two physical objects based on inductive coupling between the objects, the apparatus comprising:
a first inductor coupled to a first capacitor in parallel to form a first inductor-capacitor pair wherein the first inductor-capacitor pair is coupled to a first object, and wherein the first inductor generates an inductive field responsive to a transmit signal, the transmit signal encoding a data value;
a second inductor coupled to a second capacitor in parallel to form a second inductor-capacitor pair wherein the second inductor-capacitor pair is coupled to a second object, and wherein the second inductor generates a signal responsive to the inductive field generated by the first inductor; and
a processor coupled to the second inductor-capacitor pair, wherein the processor is configured to process the signal generated by the second inductor to decode the data value encoded in the transmit signal.

21. The apparatus of claim 20, wherein the processor is coupled to the second inductor via a an analog to digital convertor, the analog to digital convertor for converting the generated signal to a digital signal output.

22. The apparatus of claim 20, wherein the processor is coupled to the second inductor via a comparator, wherein the comparator compares the generated signal with a fixed threshold signal, to output a set of pulses.

23. The apparatus of claim 20, wherein the first inductor-capacitor has a resonant frequency within a first threshold value of a resonant frequency of the second inductor-capacitor pair.

24. The apparatus of claim 23, wherein the transmit signal includes a signal component at a frequency within a second threshold value of a resonant frequency of the first inductor-capacitor pair.

25. The apparatus of claim 20, wherein the first inductor is physically placed at an angle perpendicular to a circuit board within a threshold angle value, the circuit board comprising at least one component electronically connected to the first inductor.

26. A circuit for transmitting and receiving signal across two physical objects via inductive coupling, the circuit comprising:
a first inductor coupled in parallel to a first capacitor to form a first inductor-capacitor pair a first end of the first inductor-capacitor pair connected to a ground connection;
a transmit signal connected to a second end of the first inductor-capacitor pair, wherein the transmit signal is a varying voltage signal causing the inductor to generate an inductive field receivable by a second inductor coupled in parallel to a second capacitor forming a second inductor-capacitor pair;
the first end of the first inductor-capacitor pair coupled to a circuit component such that the first end provides input to the circuit component, wherein the input to the circuit component comprises a signal generated by the inductor responsive to an inductive field impinging on the inductor; and
a processor coupled to the circuit component for receiving an output signal from the circuit component.

27. The circuit of claim 26, wherein the circuit component is an analog to digital convertor for generating a digital signal based on a strength of the signal generated by the inductor as a result of inductive field impinging on the inductor.

28. The circuit of claim 26, wherein the circuit component is a comparator for comparing the signal generated by the inductor with a threshold signal.

29. The circuit of claim 28, wherein the comparator output comprises a sequence of pulses, the number of pulses based in part on the strength of signal generated by the inductor.

30. The circuit of claim 26, wherein a first input of the comparator is coupled to the inductor and a second input of the comparator is coupled to a threshold voltage.

31. The circuit of claim 30, wherein the second input of the comparator is coupled to the threshold voltage supply via a resistor.

32. The circuit of claim 30, wherein the second input of the comparator is coupled to the ground via a capacitor.

33. The circuit of claim 26, wherein the processor is configured to determine a value indicative of a distance between the first physical object and the second physical object based on the strength of the signal generated by the inductor.

* * * * *